US011012291B2

(12) United States Patent
Rao et al.

(10) Patent No.: US 11,012,291 B2
(45) Date of Patent: May 18, 2021

(54) REMOTE ACCESS CONTROLLER SUPPORT SYSTEM

(71) Applicant: Dell Products L.P., Round Rock, TX (US)

(72) Inventors: Sanjay Rao, Austin, TX (US); Divya Vijayvargiya, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 16/176,713

(22) Filed: Oct. 31, 2018

(65) Prior Publication Data
US 2020/0136892 A1 Apr. 30, 2020

(51) Int. Cl.
*H04L 12/24* (2006.01)

(52) U.S. Cl.
CPC .......... *H04L 41/069* (2013.01); *H04L 41/065* (2013.01); *H04L 41/0672* (2013.01); *H04L 41/22* (2013.01)

(58) Field of Classification Search
CPC .. G06F 11/07; G06F 11/0703; G06F 11/0709; G06F 11/0751; G06F 11/0766; G06F 11/0787; G06F 11/0793; G06F 8/65; G06F 11/1433; H04L 41/0672; H04L 41/069
See application file for complete search history.

(56) References Cited

U.S. PATENT DOCUMENTS

| | | | | |
|---|---|---|---|---|
| 8,527,814 | B1 * | 9/2013 | Elwell | G06F 11/0793 |
| | | | | 714/2 |
| 10,116,533 | B1 * | 10/2018 | Rodgers | H04L 63/0861 |
| 10,489,232 | B1 * | 11/2019 | BeSerra | G06F 11/0787 |
| 2003/0110245 | A1 * | 6/2003 | Sanders | G06F 11/2294 |
| | | | | 709/223 |
| 2006/0168475 | A1 | 7/2006 | Segers et al. | |
| 2009/0259739 | A1 * | 10/2009 | Cartes | H04L 43/0817 |
| | | | | 709/223 |
| 2012/0266020 | A1 * | 10/2012 | Souvannarath | G06F 11/0784 |
| | | | | 714/26 |
| 2012/0275610 | A1 * | 11/2012 | Lambert | G10K 11/16 |
| | | | | 381/56 |
| 2015/0160960 | A1 * | 6/2015 | Delco | G06F 9/45545 |
| | | | | 718/1 |
| 2017/0006060 | A1 * | 1/2017 | Venkataramani | H04W 4/029 |
| 2018/0212979 | A1 * | 7/2018 | Nakamura | H04L 63/1416 |
| 2019/0089608 | A1 * | 3/2019 | VanGilder | H04L 43/045 |
| 2019/0205109 | A1 * | 7/2019 | Smitthimedhin | G06F 11/3006 |
| 2020/0007607 | A1 * | 1/2020 | Maxilom | G06F 8/00 |

* cited by examiner

*Primary Examiner* — Matthew M Kim
*Assistant Examiner* — Kurosu Risa Altaf
(74) *Attorney, Agent, or Firm* — Haynes and Boone, LLP

(57) ABSTRACT

A remote access controller support system includes a first server device that includes a first remote access controller that is coupled to a support system and a client device through an out-of-band network connection. The first remote access controller detects a server device event at the first server device. The first remote access controller correlates the event with a stored server device event and determines a recommended action associated with the stored server device event. The first remote access controller causes, via the out-of-band network connection, the recommended action to be displayed on a display device of the client device.

17 Claims, 6 Drawing Sheets

REMOTE ACCESS CONTROLLER SUPPORT SYSTEM

BACKGROUND

The present disclosure relates generally to information handling systems, and more particularly to providing a support system for information handling systems via a remote access controller.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are often managed in order to update firmware, restore platforms, retrieve server event/error logs, retrieve or update boot configuration data, and/or provide for a variety of other server management activities known in the art. In conventional systems, server devices may include a remote access controller (e.g., a Dell Remote Access Controller (DRAC), an integrated DRAC (iDRAC) available from DELL® Inc. of Round Rock, Tex., United States, and/or other Baseboard Management Controllers (BMCs) known in the art) that performs much of the management for the server device, and that may utilize management data (e.g., firmware image data, platform restore data, server event/error logs, boot configuration data, etc.) for performing a variety of out-of-band server management activities known in the art.

In some situations, the remote access controller in a server device may enroll with a support system that is configured to provide support for the server device such as, for example, detecting server errors and resolving those server errors via the remote access controller. Often, a user of a server device must purchase a service contract to receive support provided by the support system. However, investing in such a support service is impractical for customers such as small and midsize business (SMB) customers. Thus, if an event occurs in a server device, the user must contact technical support to diagnose the event, which requires the allocation of substantial resources by the server device provider to provide a technical support call center and technical support staff, and is time and labor intensive for both the user and server device provider.

Accordingly, it would be desirable to provide an improved remote access controller support system.

SUMMARY

According to one embodiment, an information handling system (IHS) includes a plurality of server device components; and a first remote access controller, wherein the first remote access controller is coupled to the plurality of server device components and coupled to a support system and a client device through an out-of-band network connection, and wherein the first remote access controller is configured to: detect a server device event in at least one of the plurality of server device components; correlate the server device event with a stored server device event; determine a recommendation action associated with the stored server device event; and cause, via the out-of-band network connection, the recommendation action to be displayed on a display device of the client device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
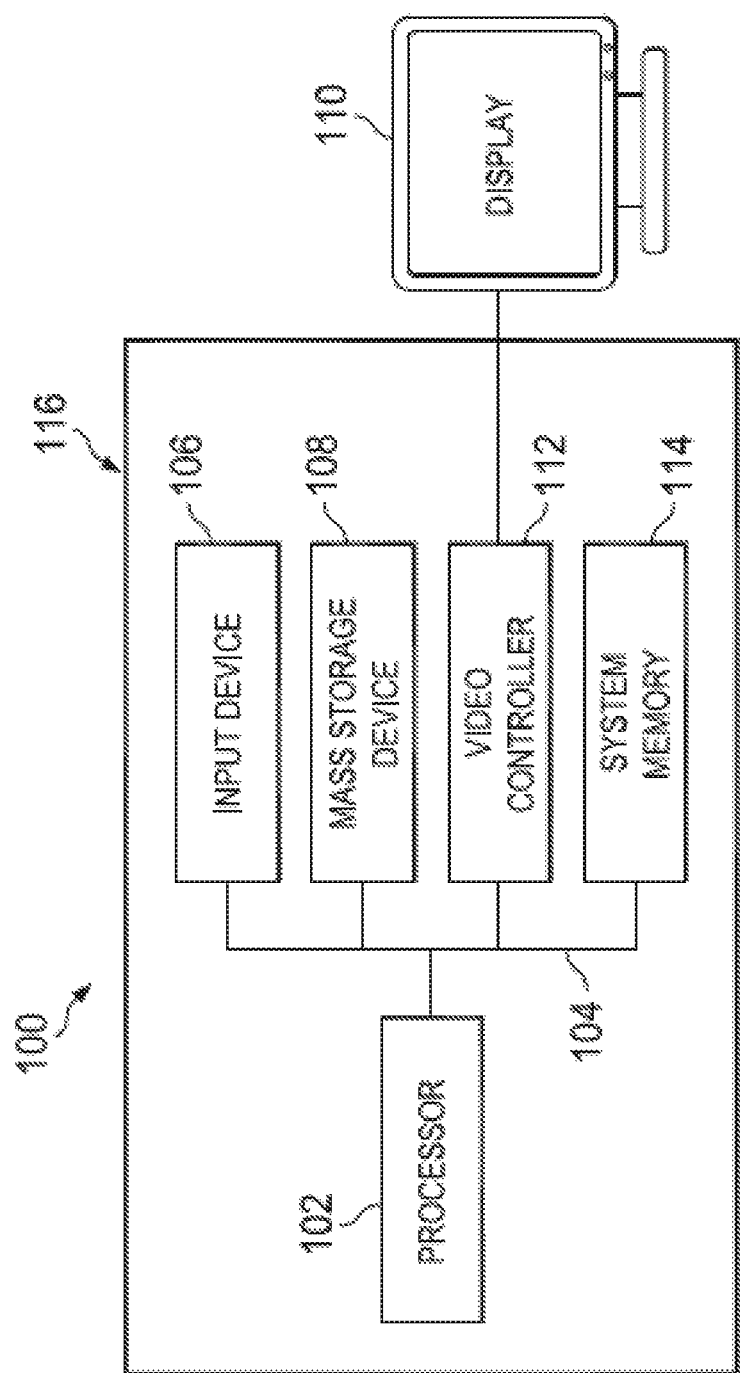
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
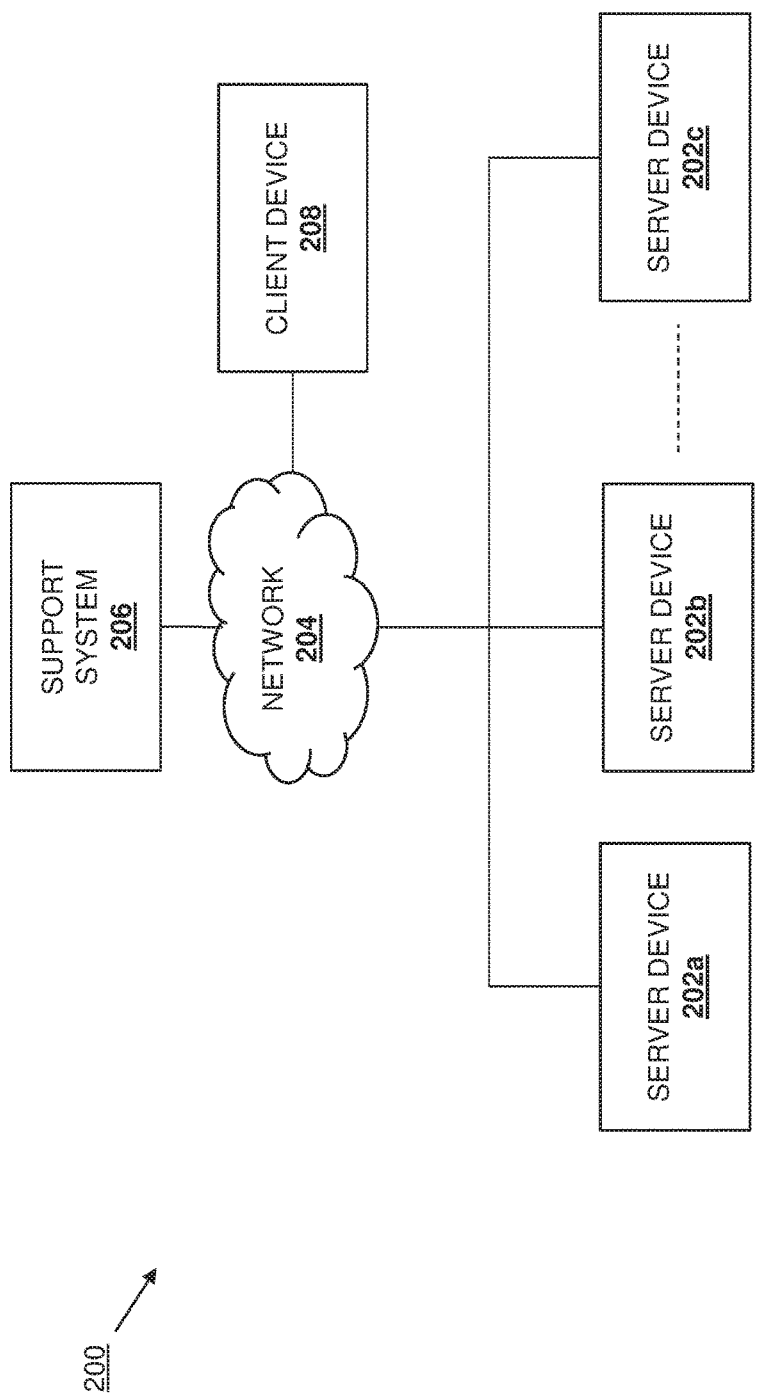
FIG. 2 is a schematic view illustrating an embodiment of a network including server devices coupled to a support system.

Referring now to FIG. 2, an embodiment of a network 200 is illustrated that may be utilized to perform the remote access controller support of the present disclosure. In the illustrated embodiment, the network 200 includes a plurality of server devices 202a, 202b, and up to 202c. Any or all the server devices 202a-c may be provided by the IHS 100 discussed above with reference to FIG. 1, and/or may include some or all the components of the IHS 100. However, while the computing devices that provide the remote access controller support of the present disclosure are illustrated and described below as server devices, one of skill in the art in possession of the present disclosure will recognize that other types of devices including networking devices, storage devices, desktop computing devices laptop/notebook computing devices, tablet computing devices, mobile phones, and/or other computing devices known in the art may require support and thus will benefit from the teachings of the present disclosure as well. Each of the server devices 202a-c may be coupled to a network 204 that may be provided by Local Area Networks (LANs), the Internet, and/or a variety of other networks that would be apparent to one of skill in the art in possession of the present disclosure.

A support system 206 is also coupled to the network 204, and may include one or more support devices (e.g., server devices and/or other computing devices) that are configured to provide the support for the server devices 202a-c discussed below. For example, the support system 206 may operate to provide SUPPORTASSIST® available from DELL® Inc. of Round Rock, Tex., United States. Furthermore, a client device 208 may be coupled to the network 204, and may be configured as an access terminal for respective remote access controllers included in each of the server device 202a-c. In an embodiment, the client device 208 may be provided by the IHS 100 discussed above with reference to FIG. 1, and/or may include some or all of the components of the IHS 100, and in specific examples may be provided by desktop computing devices, laptop/notebook computing devices, tablet computing devices, mobile phones, and/or other computing devices that one of skill in the art in possession of the present disclosure would recognize as capable of providing an access terminal for a remote access controller. However, while a specific network 200 has been illustrated and described for performing the remote access controller support of the present disclosure, one of skill in the art in possession of the present disclosure will recognize that the remote access controller support system described herein may be provided in a variety of networks while remaining within the scope of the present disclosure as well.

Figure 3:
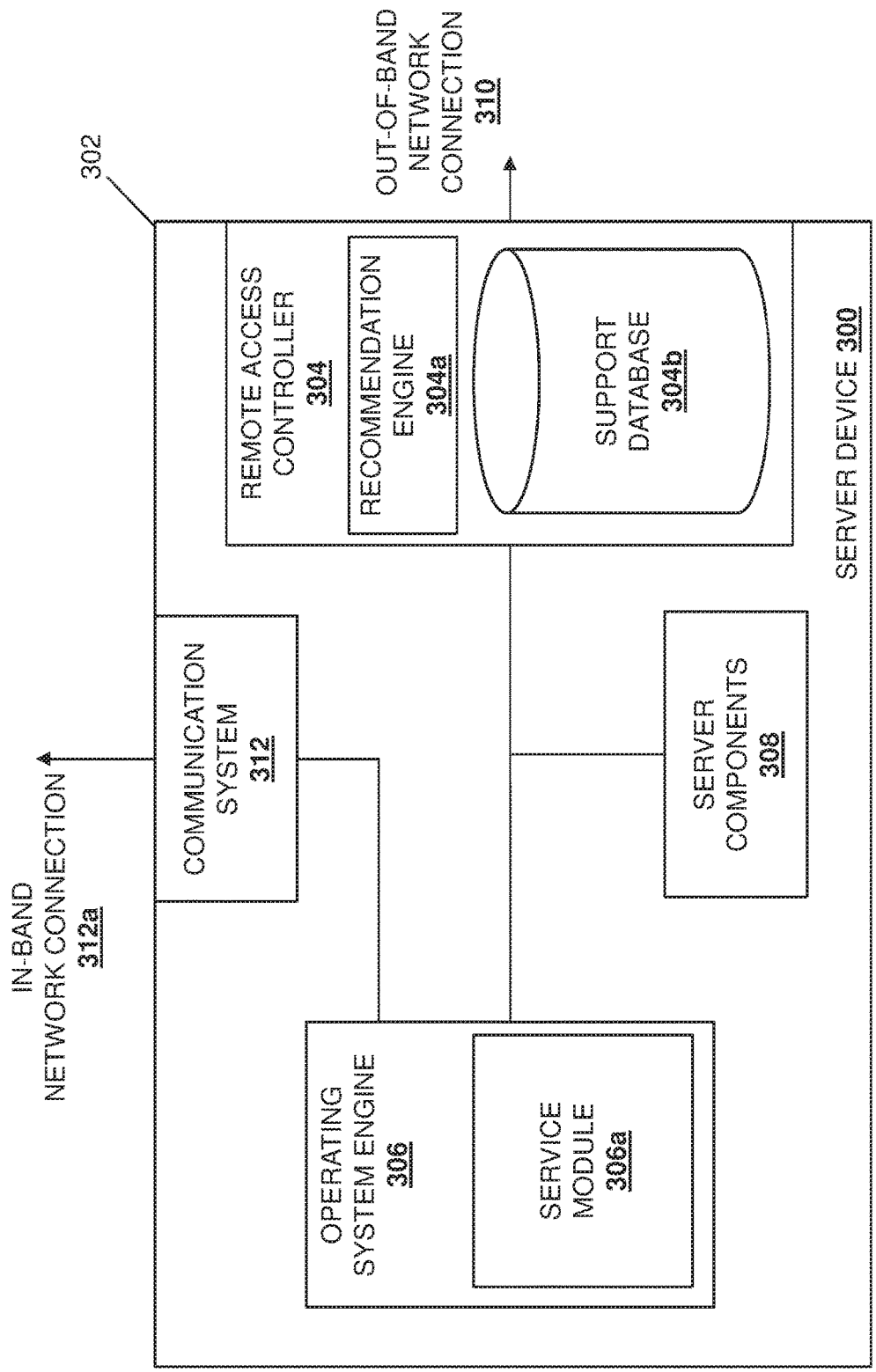
FIG. 3 is a schematic view illustrating a server device that may be provided in the network of FIG. 2.

Referring now to FIG. 3, an embodiment of a server device 300 is illustrated that may be any of the server devices 202a-c discussed above in the network 200 of FIG. 2, and that provides a specific example of the remote access controller support system of the present disclosure. In the illustrated embodiment, the server device 300 includes a chassis 302 that houses the components of the server device 300, only some of which are illustrated in FIG. 3. For example, the chassis 302 may house a remote access controller 304 that may be provided by an integrated DELL® Remote Access Controller (iDRAC) available from DELL® Inc. of Round Rock, Tex., United States. However, one of skill in the art in possession of the present disclosure will recognize that the remote access controller 304 may be provided by a Baseboard Management Controller (BMC) and/or other components with similar functionality to that described below while remaining within the scope of the present disclosure as well.

As would be understood by one of skill in the art in possession of the present disclosure, remote access controllers may provide an out-of-band management platform via, for example, a separate expansion card, or via functionality integrated into the main circuit board in the server device 300 (e.g., as with the iDRAC), and may include resources that are separate from the server device 300 and that may enable a browser-based interface and/or command line interface for managing and monitoring server components and/or other server functionality. For example, the iDRAC available from DELL® Inc. includes its own processing system, memory system, network connection, and access to the server device system bus, which enables power management, virtual media access, remote console capabilities, and other functionality that may all be available via a web browser or command-line interface, which gives system administrators the ability to configure the server device 300 as if they were sitting at a console local to the server device 300. As such, the remote access controller 304 may include an out-of-band network connection 310a to the client device 208 via the network 204, as well as one or more couplings to server components 308 (e.g., via a server device system bus) that may include a variety of server components that provide management data used by the support system, the client device, and the remote access controller 304 as discussed below.

As discussed above, the remote access controller 304 may include its own remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide recommendation engine 304a that is configure to provide support recommendations for the server device 300, as well as perform any of the other functionality discussed below. The remote access controller 304 may also include a remote access controller storage system (not illustrated, but which may include the storage device 108 discussed above with reference to FIG. 1) that is coupled to the recommendation engine 304a (e.g., via a coupling between the remote access controller storage system and the remote access controller processing system) and that may include a support database 304b that is configured to store any of the data utilized by the remote access controller 304 as discussed below.

The chassis 302 may also house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an operating system engine 306 that is configured to provide an operating system for the server device 300, as well as perform the other functionality discussed below.

In the illustrated embodiment, a service module 306a is included in the operating system engine 306 via, for example, instructions included on the memory system that, when executed by the processing system, cause the processing system to provide the service module 306a that is configured to perform the functions of the service modules discussed below. For example, the service module 306a may be provided by an integrated DELL® Remote Access Controller (iDRAC) service module (iSM) available from DELL® Inc. of Round Rock, Tex., United States. As would be understood by one of skill in the art, the iSM available from DELL® Inc. provides a lightweight software service that integrates OS features with the iDRAC available from DELL® Inc., and include functionality such as providing OS information to the iDRAC, adding capabilities such as lifecycle log event replication into the operating system log, WINDOWS® Management Instrumentation (WMI) support (including storage), iDRAC Simple Network Management Protocol (SNMP) alerts via the operating system, iDRAC hard reset and remote full power cycle capabilities, automated report collection processes, and other functionality, while producing relatively little impact on the processing system (and a relatively small footprint in the memory system).

The chassis 302 may also house a communication system 312 that is coupled to the operating system engine 306 (e.g., via a coupling between the communication system 312 and the processing system), and that may include a NIC, a wireless communication system (e.g., a BLUETOOTH® communication system, a WiFi communication system, a Near Field Communication (NFC) system, etc.), and/or a variety of other communication components that would be apparent to one of skill in the art in possession of the present disclosure. The communication system 312 includes an in-band network connection 312a to the network 204 that may provide a separate network connection from the out-of-band network connection 310a that is provided for the remote access controller 304. While a specific server device 300 providing the remote access controller support system of the present disclosure has been illustrated and described, one of skill in the art in possession of the present disclosure will recognize that remote access controller support systems according to the teachings of the present disclosure, as well as server devices in the examples provided below, may include a variety of components and/or component configurations for providing conventional functionality, as well as the functionality discussed below, while remaining within the scope of the present disclosure as well.

Figure 4:
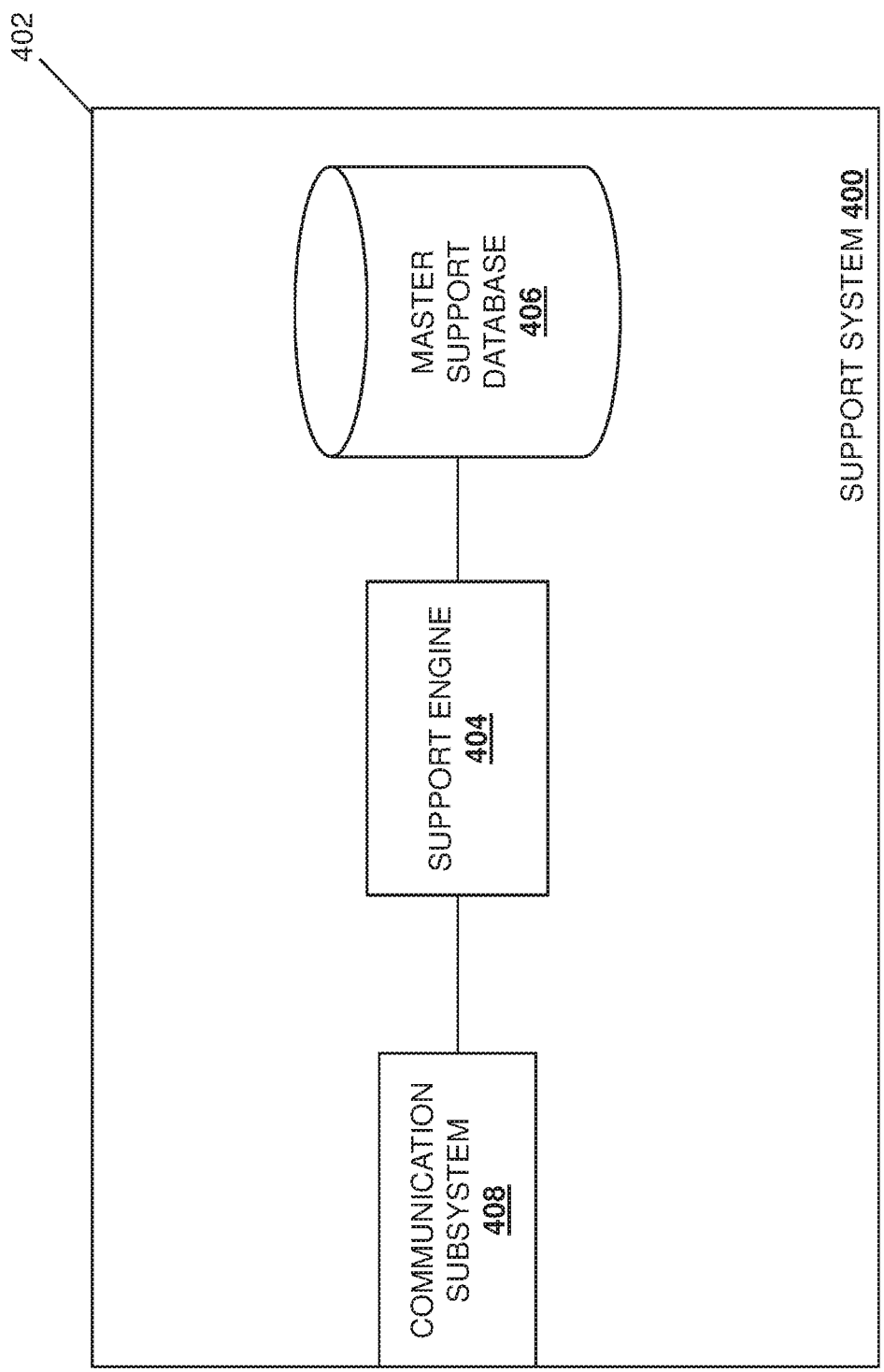
FIG. 4 is a schematic view illustrating a support system that may be provided in the network of FIG. 2.

Referring now to FIG. 4, an embodiment of a support system 400 is illustrated that may be the support system 206 discussed above with reference to FIG. 2. As such, the support system 400 may be the IHS 100 discussed above with reference to FIG. 1 and/or may include some or all of the components of the IHS 100, and in specific examples may be provided by one or more servers in a server rack or server chassis. In the illustrated embodiment, the support system 400 includes a chassis 402 that houses the components of the support system 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a support engine 404 that is configured to perform the functions of the support engines and support systems discussed below.

The chassis 402 may also house a storage system (not illustrated, but which may include the storage device 108 discussed above with reference to FIG. 1) that is coupled to the support engine 404 (e.g., via a coupling between the storage system and the processing system) and that may include a master support database 406 that is configured to store the data utilized by the support engine 404 as discussed below. The chassis 402 may also house a communication subsystem 408 that is coupled to the support engine 404 (e.g., via a coupling between the communication subsystem 408 and the processing system) and that may include a Network Interface Controller (NIC), a wireless communication devices, one or more ports, and/or other communication components that would be apparent to one of skill in the art in possession of the present disclosure. While a specific support system 400 has been described, one of skill in the art in possession of the present disclosure will recognize that support systems may include a variety of other components that perform conventional server device functionality, as well as the functionality described below, while remaining within the scope of the present disclosure.

Figure 5:
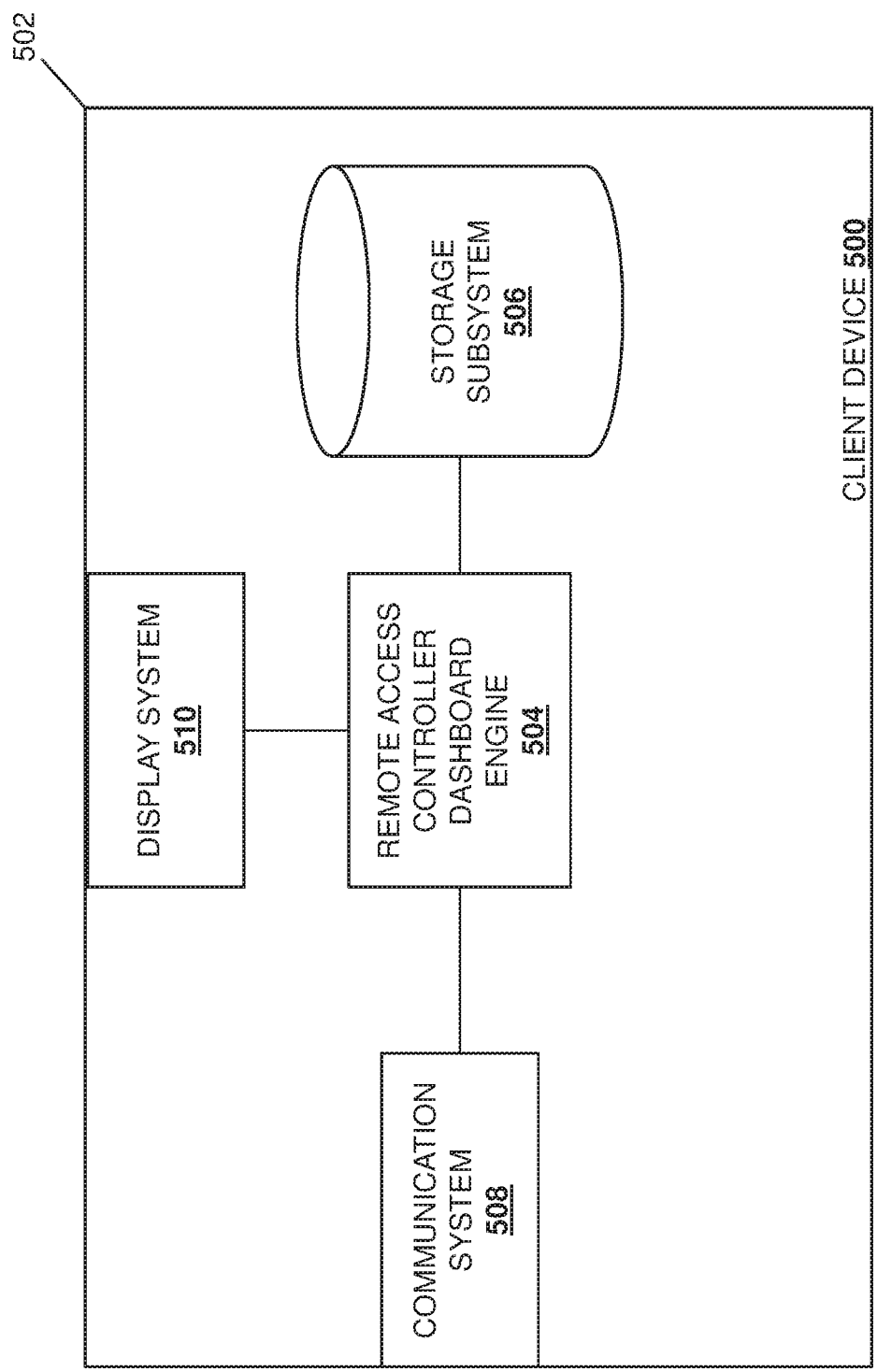
FIG. 5 is a schematic view illustrating a client device that may be provided in the network of FIG. 2

Referring now to FIG. 5, an embodiment of a client device 500 is illustrated that may provide the client device 208 discussed above with reference to FIG. 2. As such, the client device may be the IHS 100 discussed above with reference to FIG. 1 and/or may include some or all of the components of the IHS 100. In the illustrated embodiment, the client device 500 includes a chassis 502 that houses the components of the client device 500, only some of which are illustrated in FIG. 5. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a remote access controller dashboard engine 504 that is configured to perform the functionality of the remote access controller dashboard engines and client devices discussed below.

The chassis 502 may also house a storage system (not illustrated, but which may include the storage device 108 discussed above with reference to FIG. 1) that is coupled to the remote access controller dashboard engine 504 (e.g., via a coupling between the storage system and the processing system) and that includes a storage subsystem 506 that is configured to store any of the data and/or other information utilized by the remote access controller dashboard engine 504 as described below. The chassis 502 may also house a communication system 508 that is coupled to the remote access controller dashboard engine 504 (e.g., via a coupling between the communication system 508 and the processing system) and may include a Network Interface Controller (NIC), a wireless communication subsystem (e.g., a BLUETOOTH® wireless communication system, a WiFi wireless communication system, etc.), and/or other communication components that allow for the communications via a network (e.g., the network 204 of FIG. 2) discussed below.

The chassis 502 also houses a display system 510 that is coupled to the remote access controller dashboard engine 504 (e.g., via a coupling between the processing system and the display system 510). In an embodiment, the display system 510 may be provided by a display device that is integrated into the client device 500 and that includes a display screen (e.g., a cathode ray tube (CRT) display screen, a light-emitting diode (LED) display screen, a liquid crystal display (LCD) screen, an organic light-emitting diode (OLED) display screen, and/or any other display screen that would be apparent to one of skill in the art in possession of the present disclosure). In another embodiment, the display system 510 may be provided by a display device that is coupled directly to the client device 500 (e.g., a display device coupled to the client device 500 by a cable or wireless connection). As discussed below, the display screen on the display system 510 may be configured to display a graphical user interface (GUI) provided by the remote access controller dashboard engine 504. However, while a specific client device 500 has been illustrated and described, one of skill in the art in possession of the present disclosure will recognize that the client device may include a variety of components and component configurations that would enable the functionality discussed below while remaining within the scope of the present disclosure.

Figure 6:
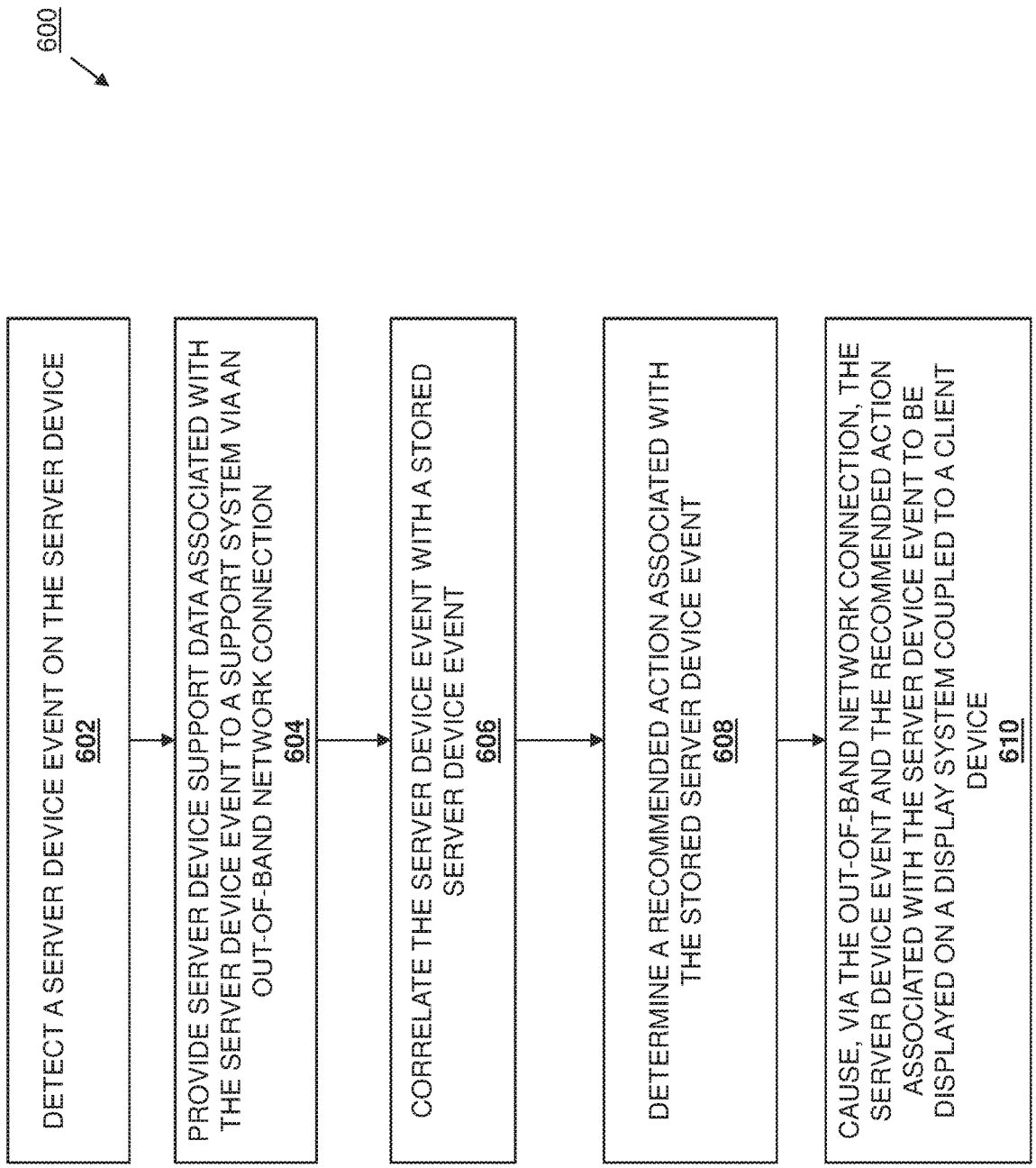
FIG. 6 is a flow chart illustrating an embodiment of a method for providing remote access controller support.

Referring now to FIG. 6, an embodiment of a method for providing support for a server device using a remote access controller is illustrated. As discussed below, the systems and methods of the present disclosure provide remote access controller support that allow a user of a server device, via a remote access controller dashboard provided by a client device, to receive recommended actions for server device events that occur on the server device. A support system may be coupled to the remote access controller in the server device via an out-of-band network connection, which allows the support system to periodically provide at least one recommended action for a server device event occurring in the server device via the out-of-band network connection to the remote access controller. For example, the remote access controller may monitor the server device for server device events, and when a server device event is detected and the server device event correlates with a stored server device event, the remote access controller may cause the at least one recommended action to be provided for display on the client device that provides the remote access controller dashboard. In addition, the remote access controller of the server device may provide server device event data to the support system to allow the support system to identify common server events occurring in server devices of the same type, as well as determine recommended actions for those events. Those server device events and associated recommended actions may then be provided to other server devices that experience the server events. As such, the systems and methods of the present disclosure provide a self-service mechanism for a user of a server device to receive benefits of a support system without that customer purchasing an expensive support system plan that services the server device via the remote access controller remotely, which produces increased efficiencies and decreased costs associated with a user contacting technical support when the server device experiences a server device event.

The method 600 begins at block 602 where a remote access controller in a server device detects a server device event occurring in the server device. In an embodiment of block 602, the remote access controller 304 in the server device 300, which may be any of the server devices 202*a*, 202*b*, and up to 202*c* of FIG. 2, may monitor the server device 300 for the occurrence of a server device event. For example, the remote access controller 304 may monitor the server components 308, the processing system, the memory system, the communication system 312, and/or any other components in the server device 300 that would be apparent to one of skill in the art in possession of the present disclosure and producing the server device events described herein. For example, the remote access controller 304 may detect server device events such as warnings, failures, log inputs, and/or other server device events that may be identified by server component sensors that monitor the server component 308 and that may be provided by temperature sensors, power sensors, and other server component sensors that would be apparent to one of skill in the art in possession of the present disclosure. In some embodiments, at block 602 the remote access controller 304 may also detect an error that occurs when the user attempts to perform an operation that fails. For example, a user may be attempting to install or update a software package, which may cause the error detected as the server device event at block 602. While specific examples of server device events have been discussed, one of skill in the art in possession of the present disclosure would recognize that a variety of server device events will fall within the scope of the present disclosure as well.

The method 600 may then proceed to block 604 where the remote access controller in the server device provides server device support data associated with the server device event to a support system via an out-of-band network connection. In an embodiment of block 604, the remote access controller 304 may provide, to the support system 206 via the out-of-band network connection 310, sever device support data associated with the server device event that was detected at block 602. For example, the support data may include any of log files, error notifications, sensor data, status information, server device identifiers, and/or any other support data that one of skill in the art in possession of the present disclosure would recognize is retrievable by the remote access controller and that may be used by the support system 206 to provide a support service. In some embodiments, at block 602, the server device event detected by the remote access controller 304 may include detecting a server device support data collection event that is configured to collect a variety of server device support data from the server device, and provide that server device support data to the support system 206. For example, the service module 306*a* may utilize SUPPORTASSIST® available from DELL® Inc. of Round Rock, Tex., United States, which may include providing support software on the server device (which may include software that provides support data collection) that is configured to collect server device support data and provide that server device support data to the support system 206 via the remote access controller 304. As such, one of skill in the art in possession of the present disclosure will recognize that such server device support data collections, and server device support data collection events, may be regularly scheduled (hourly, daily, weekly, monthly, yearly, and/or at any other reoccurring time), or may be instructed by a user as desired at any time. In various embodiments, block 604 of method 600 may be optional, and thus may be omitted from the method 600 while remaining within the scope of the present disclosure.

The method 600 may then proceed to block 606 where the remote access controller in the server device correlates the server device event with a stored server device event. In an embodiment of block 606, the recommendation engine 304*a* in the remote access controller 304 may correlate the server device event detected in block 602 with a stored server device event by determining that the detected server device event is substantially similar to a server device event that may be included in a plurality of server device events that are stored in the support database 304*b*. For example, the server device event may correlate with a stored server device event if server device support data associated with the server device event satisfies a predetermined condition when compared with the stored server device support data associated with the stored server device event. For example, in order for the server device support data to correlate with the stored server device support data, the server device support data may have to match 100% of the stored server device support data, match 99% of the stored server device support data, match 90% of the stored server device support data, match 75% of the stored server device support data, match 50% of the stored server device support data, and/or any satisfy any other matching condition that would be apparent to one of skill in the art. In another example, the server device event may correlate with a stored server device event if the server device support data associated with the server device event has the highest correspondence with the stored server device support data associated with a stored server device event of all of the available stored server device events in the support database 304*b*. The correlation may be determined based on server device support data such as a server configuration, a device configuration, and/or firmware that is the source of the server device event.

In an embodiment, the remote access controller 304 may receive, through the out-of-band network connection 310 from the support system 206, the stored server device support data that is associated with a stored server device event that is stored at the support database 304*b*. The stored server device event, and the stored server device support data associated with the stored server device event provided by the support system 206, may be provided in a secure package. For example, the secure package may be of a type that is permitted by the remote access controller 304 to provide changes to the remote access controller 304. For example, the secure package may be a Dell EMC Update Package (DUP) available from DELL® Inc. of Round Rock, Tex., United States, and may include a self-contained executable in a standard package format that may be configured to update remote access controller firmware in the remote access controller 304. As such, the remote access controller 304 may receive the secure packages periodically based on updates, new recommendations to server devices events, and/or changes in server device events.

In various embodiments, the stored server device events and the stored server device support data provided by the support system 206 may be based on the server device support data provided to the support system 206 in block 604 of method 600. In other embodiments, the stored server device events and the stored server device support data may be based on server device support data provided by other server devices. For example, the remote access controller 304 in server device 202*a* may receive, from the support system 206, a stored server device event that includes stored server device support data for that stored server device event that is based on server device support data that was provided to the support system 206 from one or more server devices (e.g., the server device 202*b* and/or up to the server device 202*c*). In some examples, the support system 206 may utilize machine learning algorithms to determine a server device event to send out as a stored server device event, and determine which of the remote access controllers in the server devices of the network 204 should receive a secure package with the stored server device event (and its associated stored server device event data). For example, the support engine 404 of the support system 206 may include one or more machine learning algorithms that it is configured to utilize in performing supervised machine learning, unsupervised machine learning (e.g., deep belief networks, neural networks, statistical pattern recognition, rule-based artificial intelligence, etc.), semi-supervised learning, reinforcement learning, deep learning, and other machine learning techniques when providing secure packages that include updates to stored server device events provided in the support database 304*b* included in the remote access controller 304. Furthermore, the support engine 404 may store the stored server device events and stored server device support data in the master support database 406 of the support system 206. In specific examples, the server device events may be associated with various server device types, server device configurations, software packages, and/or by any other server device component that would be apparent to one of skill in the art, and the support engine 404 may provide stored server device events and the stored server device support data for those stored sever device events to appropriate remote access controllers that are coupled to specific server device components that are associated with and relevant to the stored server device events.

The method 600 may then proceed to block 608 where the remote access controller determines a recommended action associated with the stored server device event that is correlated with the detected server device event. In various embodiments, each stored server device event in the support database 304*b* may be associated with one or more recommended actions, and the recommended actions may be provided by the support system 206 when providing the stored server device events and stored server device support data to the remote access controller 304 to be stored in the support database 304*b*. The recommended action may include one or more actions that the user may perform to resolve the issue. In an embodiment, upon correlating the detected server device event with the stored server device event, the recommendation engine 304*a* may obtain the recommended action that is associated with the stored server device event.

In various embodiments, the recommended action may include actions that may be completed before a user of the server device gives permission to complete the recommended action. For example, the recommended action may include updating firmware that is the source of the server device event. The recommendation engine 304*a* may cause the remote access controller 304 to retrieve the firmware update from the support system 206 and store the firmware update in the support database 304*b*, and the firmware update may be stored at the support database 304*b* until the remote access controller receives a command to install the firmware update. While the firmware update is described as being retrieved from the support system 206 in response to determining a correlation between the server device event and the stored server device event, a portion of the recommended action may be performed at other times, such as when the stored server device event and stored server device support data are provided to the remote access controller 304 from the support system 206, after a user has issued a command to perform the recommended action, and/or at any other time that would be apparent to one of skill in the art in possession of the present disclosure.

The method 600 then proceeds to block 610 where the remote access controller causes, via the out-of-band network connection, the server device event and the recommended actions associated with the server device event to be displayed on a display system coupled to a client device. In an embodiment of block 610, the recommendation engine 304a in the remote access controller 304 may provide, via the out-of-band network connection 310, the detected server device event and the recommended action to the client device 208, which allows the remote access controller dashboard engine 504 to display the server device event and recommended action on a display device in the display system 510 of the client device 208. In various embodiments, the remote access controller dashboard engine 504 may provide a web browser that the user of the client device 500 may use to access the remote access controller 304 through the out-of-band network connection 310. For example, the web browser may provide a remote access controller dashboard graphical user interface that displays the server device events and recommended actions associated with the stored server device events to the user via the display system 510. In other examples, the remote access controller dashboard engine 504 may include a command line interface (CLI) through which the user may provide commands to obtain server device events and associated recommended actions.

Thus, systems and method have been described that provide a remote access controller support system for server devices that may provide recommended actions for those server devices based on server device events occurring in those server devices. The recommended actions may be accessed using a remote access controller dashboard on a display device of a client device that is coupled to the remote access controller via an out-of-band network connection. The server device events and associated recommended actions may be provided via the out-of-band network connection to the remote access controller from a support system, and the support system may periodically update the server device events and recommended actions based on server device support data that it receives from the remote access controllers in the server devices included in the network. The user may use the recommended actions to respond to a server device event that is detected by the remote access controller and that correlates with stored server device events that were provided by the support system. As such, the user may self-service the server device without contacting technical support and without buying an expensive support service.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A remote access controller support system, comprising:
   a client device; and
   a first server device that includes a first remote access controller that is coupled to the client device through an out-of-band network connection, wherein the first remote access controller is configured to:
   detect, in response to monitoring at least one first server device component, a first server device event at the first server device, wherein the first server device event is detected based on first server device event data obtained from the at least one first server device component that includes at least an operating system running on a processing system that is separate from a remote access controller processing system providing the first remote access controller;
   correlate the first server device event with a stored second server device event that was received in a secure package including a self-contained executable that is configured to update remote access controller firmware utilized by the first remote access controller;
   determine a recommended action associated with the stored second server device event; and
   cause, via the out-of-band network connection, the recommended action to be displayed on a display system coupled to the client device.

2. The system of claim 1, further comprising:
   a support system that is coupled to the first remote access controller through the out-of-band network connection, wherein the first remote access controller is configured to:
   provide, to the support system via the out-of-band network connection, the first server device support data associated with the first server device event.

3. The system of claim 2, wherein the providing the first server device support data associated with the first server device event to the support system via the out-of-band network connection is performed by the first remote access controller in response to determining that the first server device event does not correlate with the stored second server device event.

4. The system of claim 1, further comprising:
   a support system that is coupled to the first remote access controller through the out-of-band network connection, wherein the first remote access controller is configured to:
   receive, via the out-of-band network connection from the support system, the secure package including a second server device event shaving second server device support data associated with the first server device and the recommended action, wherein the second server device event is stored as the stored second server device event and with the recommendation action.

5. The system of claim 4, wherein the second server device support data is based on server device support data provided by a second server device using a second remote access controller and via a second out-of-band network connection with the support system.

6. The system of claim 5, wherein the second server device and the first server device are of the same type of server device.

7. An information handling system (IHS), comprising:
   a plurality of server device components; and
   a first remote access controller, wherein the first remote access controller is coupled to the plurality of server device components and coupled to a client device through an out-of-band network connection, and wherein the first remote access controller is configured to:
   detect, in response to monitoring at least one first server device component included in the plurality of server device components, a first server device event in the at least one first server device component, wherein the first server device event is detected based on first server device event data obtained from the at least one first server device component that includes at least an operating system running on a processing system that is separate from a remote access controller processing system providing the first remote access controller;

correlate the first server device event with a stored second server device event that was received in a secure package including a self-contained executable that is configured to update remote access controller firmware utilized by the first remote access controller;

determine a recommendation action associated with the stored second server device event; and cause, via the out-of-band network connection, the recommended action to be displayed on a display system coupled to the client device.

8. The IHS of claim 7, wherein the first remote access controller is coupled to a support system through the out-of-band network connection, wherein the first remote access controller is configured to:

provide, to the support system via the out-of-band network connection, the first server device support data associated with the first server device event.

9. The IHS of claim 8, wherein the providing the first server device support data associated with the first server device event to the support system via the out-of-band network connection is performed by the first remote access controller in response to determining that the first server device event does not correlate with the stored second server device event.

10. The IHS of claim 7, wherein the first remote access controller is coupled to a support system through the out-of-band network connection, wherein the first remote access controller is configured to:

receive, via the out-of-band network connection from the support system, the secure package including a second server device event having second server device support data associated with the at least one of the plurality of first server device components and the recommended action, wherein the second server device event is stored as the stored second server device event and with the recommendation action.

11. The IHS of claim 10, wherein the second server device support data is based on server device support data provided by at least one of a plurality of second server device components of a second server device using a second remote access controller and via a second out-of-band network connection with the support system.

12. The IHS of claim 11, wherein the at least one of the plurality of first server device components and the at least one of the plurality of second server device components are of the same type of server device.

13. A method of providing support using a remote access controller, comprising detecting, by a first remote access controller included in a first server device and in response to monitoring at least one first server device component included in the first server device, a first server device event in the at least one first server device component included in the first server device and coupled to the first remote access controller, wherein the first server device event is detected based on first server device event data obtained from the at least one first server device component that includes at least an operating system running on a processing system that is separate from a remote access controller processing system providing the first remote access controller;

correlate, by the first remote access controller, the first server device event with a stored second server device event that was received in a secure package including a self-contained executable that is configured to update remote access controller firmware utilized by the first remote access controller;

determine, by the first remote access controller, a recommendation action associated with the stored second server device event; and cause, by the first remote access controller and via an out-of-band network connection coupled to a client device, the recommendation action to be displayed on a display system coupled to the client device.

14. The method of claim 13, further comprising:

providing, by the first remote access controller to a support system coupled to the first remote access controller via the out-of-band network connection, the first server device support data associated with the first server device event.

15. The method of claim 14, wherein the providing the first server device support data associated with the first server device event to the support system via the out-of-band network connection is performed by the first remote access controller in response to determining that the first server device event does not correlate with the stored second server device event.

16. The method of claim 13, further comprising:

receiving, by the first remote access controller and from a support system coupled to the first remote access controller via the out-of-band network connection, the secure package including a second server device event having second server device support data associated with the first server device and the recommended action, wherein the second server device event is stored as the stored second server device event and with the recommendation action.

17. The method of claim 16, wherein the second server device support data is based on server device support data provided by a second server device using a second remote access controller and via a second out-of-band network connection with the support system.

* * * * *